No. 771,552. PATENTED OCT. 4, 1904.
M. KANE.
GRAIN LIFTING ATTACHMENT FOR HARVESTING MACHINES.
APPLICATION FILED JULY 18, 1904.
NO MODEL.

WITNESSES:
J. N. Daggett.
T. H. Alfrds.

INVENTOR
Maurice Kane
By J. C. Warnes,
Atty.

No. 771,552. Patented October 4, 1904.

UNITED STATES PATENT OFFICE.

MAURICE KANE, OF CHICAGO, ILLINOIS.

GRAIN-LIFTING ATTACHMENT FOR HARVESTING-MACHINES.

SPECIFICATION forming part of Letters Patent No. 771,552, dated October 4, 1904.

Application filed July 18, 1904. Serial No. 216,949. (No model.)

*To all whom it may concern:*

Be it known that I, MAURICE KANE, a citizen of the United States, residing at Chicago, in the county of Cook and State of Illinois, have invented a new and useful Improvement in Grain-Lifting Attachments for Harvesting-Machines, of which the following is a complete specification.

The present invention relates to that class of devices adapted to be attached to the finger-bars of mowing and harvesting machines, the object thereof being to raise the leaning or prostrate material before it is severed by the cutting apparatus. The general utility of such an improvement for use in lodged grain is obvious; but it is more particularly applicable to harvesting peas, because unless the vines are lifted before being presented to the cutting apparatus many pods will be severed and the peas thus wasted.

Said invention consists, essentially, in a lifting-arm having a saddle-shaped sheath underlying that portion of the guard or finger which projects forwardly of the finger-bar, the said sheath being provided with two laterally-arranged lugs extending rearwardly therefrom, between which lugs is received the heel of the guard or finger. The object is to provide a two-point support beneath and at the rear of the finger-bar and a construction which will extend a less distance beneath the said finger-bar, and hence reduce the obstructing tendency of same. The construction is clearly set forth in the accompanying drawings, in which—

Figure 1:
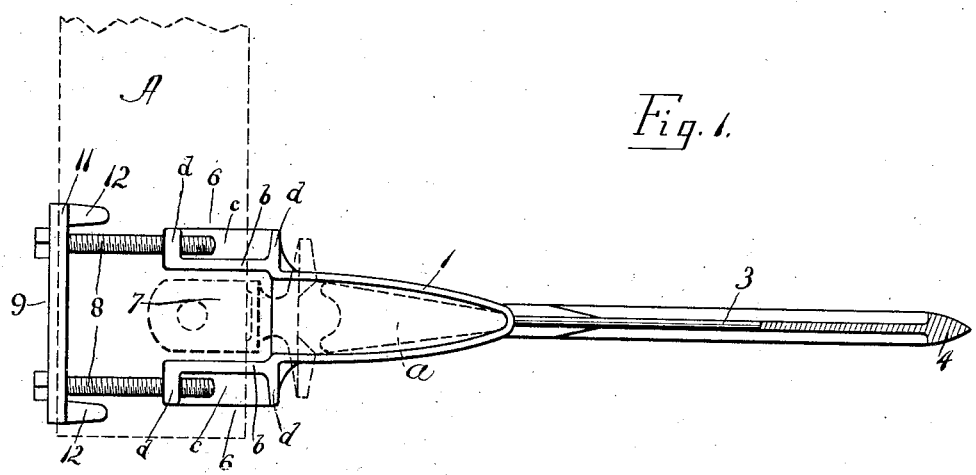
Figure 2:
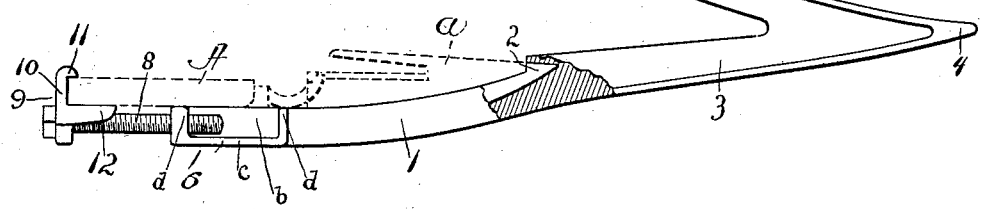
Figure 3:
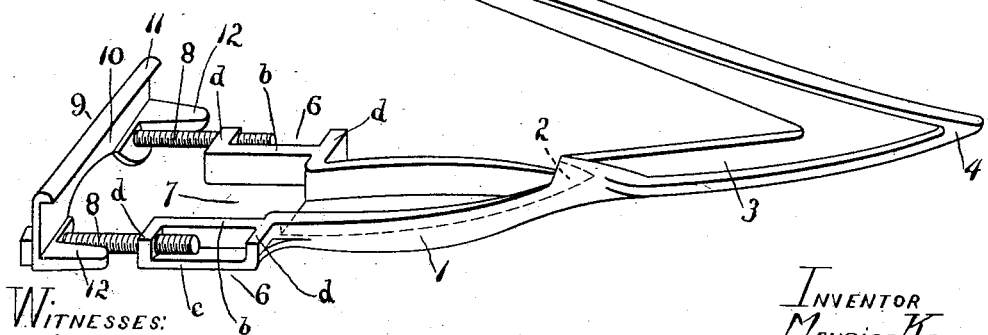

Figure 1 represents a plan view of the attachment, the upwardly and rearwardly projecting lifting-arm being shown removed, while the finger-bar and a guard or finger appear in dotted lines in their proper relative positions. Fig. 2 is a corresponding side elevation of same, and Fig. 3 is a detached perspective of the improvement.

Referring to the drawings, A designates the finger-bar of a mower or harvesting machine, and *a* the finger secured thereto, both of which appear in dotted lines in Figs. 1 and 2.

1 designates the saddle-shaped sheath provided with the aperture 2 at its forward end adapted to receive the point of the finger or guard *a*, as clearly shown in Fig. 2. Extending forwardly and slightly upwardly from the sheath 1 and integral therewith is the ribbed portion 3, which terminates in the point 4. Extending rearwardly and upwardly from the point 4 is the lifting-arm 5, which serves the usual function of lifting the fallen material; but claims to novelty are not made in the above-described portions. Extending rearwardly from the rear end of the said sheath 1 and laterally disposed with respect to the longitudinal axis thereof are the two lugs 6 6. These lugs are formed, preferably, of the vertically-disposed ribs *b*, which form the lateral walls of the space 7. In this space 7 is received the heel of the guard *a*. These vertically-disposed ribs *b b* are strengthened below by the webs *c* and at the ends by the walls *d*. In the walls *d* on the rearward end of the lugs are received the two cap-screws 8, which engage the bracket 9. This bracket 9 is provided with the vertically-disposed rib 10, which is provided on its upper edge with the ledge 11, adapted to engage the rear end of the finger-bar. The lugs 12 on the lower portion of the bracket lie beneath the finger-bar and, with the above-mentioned web 10, ledge 11, and cap-screws 8, afford effectual means for connecting the device to the finger-bar.

Heretofore in devices of this kind the body of the device has been made to lie beneath the heel of the finger, thus increasing the depth and obstructing tendency of same. In the device above described the heel is received between the bifurcated rear end thereof and a two-point support is given on the bottom as well as on the rear of the finger-bar.

Since the width of the finger-bar tapers outwardly, provision is made for a varying width by providing cap-screws of considerable length, so that the bracket 9 can be made to clamp upon the rear edge of the bar either at its outer narrow edge or at its wider inner edge. The space formed by the ribs *b b* and the webs *c c* receives the forward end of the cap-screws 8, and thus avoids a rearwardly-projecting threaded screw, which would operate as an obstruction on which material could accumulate.

The space immediately above the guard is not encumbered with any obstructions, as in many devices heretofore constructed for this purpose, and therefore material which is lifted upon the arm 5 will be allowed to pass freely over the top of the cutting apparatus.

What I claim as my invention, and desire to secure by Letters Patent, is—

1. An attachment for the cutting apparatus of mowing and harvesting machines comprising a saddle-shaped sheath adapted to engage that portion of the guard or finger which extends forwardly from the finger-bar, laterally-disposed lugs integral with and extending rearward from the rear end of said sheath, a finger-bar-engaging bracket and screws for securing the said bracket to said lugs, substantially as set forth.

2. An attachment for the cutting apparatus of mowing and harvesting machines comprising a saddle-shaped sheath adapted to engage that portion of the finger or guard which extends forwardly from the finger-bar the rear of said sheath terminating in a bifurcated end which straddles the heel of the finger and affords a two-point support for said sheath upon said finger-bar of the mower and a bracket secured to the bifurcated end of said sheath and adapted to engage the rear edge of said finger-bar, substantially as set forth.

MAURICE KANE.

Witnesses:
MARGARET A. SWEENEY,
J. C. WARNES.